No. 646,589. Patented Apr. 3, 1900.
H. F. WEBB.
TILE.
(Application filed Aug. 5, 1899.)

(No Model.)

Witnesses
Gladys L. Thompson

Inventor
Henry F. Webb
by Lacey
his Attorneys

UNITED STATES PATENT OFFICE.

HENRY FITZROY WEBB, OF GREENSBURG, PENNSYLVANIA, ASSIGNOR TO THE WEBB PATENT TILE COMPANY, OF COUDERSPORT, PENNSYLVANIA.

TILE.

SPECIFICATION forming part of Letters Patent No. 646,589, dated April 3, 1900.

Application filed August 5, 1899. Serial No. 726,304. (No model.)

*To all whom it may concern:*

Be it known that I, HENRY FITZROY WEBB, a citizen of the United States, residing at Greensburg, in the county of Westmoreland and State of Pennsylvania, have invented certain new and useful Improvements in Tiles; and I do hereby declare the following to be a full, clear, and exact description of the invention, such as will enable others skilled in the art to which it appertains to make and use the same.

This invention relates to mosaic-work, and most especially to the elements (tiles) comprising the same.

The primal object of the invention is the provision of a tile which will have a porous backing fused thereto and of a kindred nature to the stucco, whereby the bed is homogeneous and the tile prevented from leaving the bed when subjected to stress or a smart blow, which frequently is the case. The tile when finished is a composite structure, comprising a facial layer of glass or porcelain, a porous backing constituting a rear or inner layer, and an intermediate bonding layer caused to adhere to the facing and backing by fusion. In order that there may be a positive interlocking between the tile and the stucco, the backing of the tile has keys formed therein.

For a full description of the invention and the merits thereof and also to acquire a knowledge of the details of construction of the means for effecting the result reference is to be had to the following description and the drawings hereto attached.

While the essential and characteristic features of the invention are necessarily susceptible of modification, still the preferred embodiment of the invention is illustrated in the accompanying drawings, in which—

Figure 1:
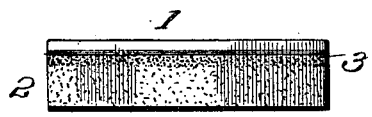
Figure 2:
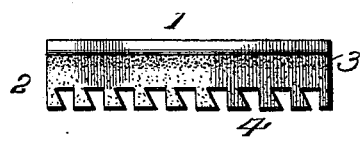
Figure 3:
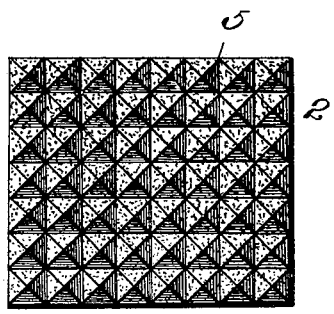

Figure 1 is an edge view of a tile constructed in accordance with this invention. Fig. 2 is a similar view showing the manner of forming the key. Fig. 3 is a view of the rear side of a tile, showing a different formation of key.

The tile proper, 1, may be a slab, tablet, or block of glass, porcelain, or kindred vitrified material and may be of any desired size, shape, and thickness. This tile is strengthened and braced by a backing 2 of porous material fused thereto by being baked at a relatively-low temperature. The backing 2 is composed of any good cement and enough flux to give it body, but not enough to impart a glaze thereto. The cement and flux when mixed are applied to the rear side of the tile and form the backing. This backing is baked at a comparatively-low temperature to fix it by fusion. The fused joint 3 constitutes a layer intermediate of the tile and backing.

The tile in its general character is a composite structure, being composed of an intermediate and outer layers, the said layers being secured together by fusion. The porous backing is well adapted to coöperate with the stucco because of the affinity of the two substances, whereby a firm bonding is effected when the tile is properly positioned and applied. The backing of the tile and the stucco become homogeneous in the formation of the mosaic.

As shown in Fig. 2, a key may be provided to form a positive interlocking connection between the tile and bed or stucco. This key 4 consists of a series of depressions in the outer face of the backing 2, formed therein while the composition is still plastic and prior to the baking operation. These diaphragms may be of any form and are preferably undercut to retain the stucco or plaster forming the bed for the mosaic-work.

As shown in Fig. 5, the key consists of a series of pyramidal-shaped projections 5, formed by intersecting grooves or channels having a relative right-angular disposition. This arrangement provides an adhering-surface of greater superficial extent than the tile, because of the sloping sides of the projections 5.

Having thus described the invention, what is claimed as new is—

1. A composite tile composed of a facial layer of vitrified material and a stucco backing fused thereto, said backing being formed of cement and a flux and applied to the facial layer in a plastic state.

2. A tile consisting of a vitrified tablet or slab and a stucco backing affixed to the tablet by fusion and having a series of projections at its rear side formed by intersecting grooves, said stucco comprising cement and a flux and applied to the tablet in a plastic state.

In testimony whereof I affix my signature in presence of two witnesses.

HENRY FITZROY WEBB. [L. S.]

Witnesses:
 J. R. SPIEGEL,
 RABE F. MARSH.